US007853337B2

(12) United States Patent
Keller et al.

(10) Patent No.: US 7,853,337 B2
(45) Date of Patent: Dec. 14, 2010

(54) DEVICE FOR MONITORING AND CONTROLLING A MACHINE

(75) Inventors: Gottfried Keller, Allmendingen (DE); Andreas Wörz, Blaustein (DE); Heinrich Walk, Allmendingen-Schwörzkirch (DE)

(73) Assignee: Rampf Formen GmbH, Allmendingen (DE)

( * ) Notice: Subject to any disclaimer, the term of this patent is extended or adjusted under 35 U.S.C. 154(b) by 0 days.

(21) Appl. No.: 11/582,138

(22) Filed: Oct. 17, 2006

(65) Prior Publication Data

US 2007/0088523 A1 Apr. 19, 2007

Related U.S. Application Data

(63) Continuation of application No. PCT/DE2005/000726, filed on Apr. 20, 2005.

(30) Foreign Application Priority Data

Apr. 20, 2004 (DE) ....................... 10 2004 019 729
Apr. 15, 2005 (DE) ....................... 10 2005 017 707

(51) Int. Cl.

| | |
|---|---|
| ***G05B 11/01*** | (2006.01) |
| *G08C 19/04* | (2006.01) |
| *G08C 19/00* | (2006.01) |
| *H02N 2/00* | (2006.01) |

(52) U.S. Cl. ............... 700/19; 340/870.11; 340/870.41; 310/319

(58) Field of Classification Search ................... 700/19; 340/870.1, 870, 870.11, 870.41; 310/319
See application file for complete search history.

(56) References Cited

U.S. PATENT DOCUMENTS

| | | | | |
|---|---|---|---|---|
| 4,075,890 | A * | 2/1978 | Iwasaki et al. | 73/295 |
| 4,796,685 | A * | 1/1989 | Hanneton et al. | 164/203 |
| 5,736,937 | A * | 4/1998 | McGirr et al. | 340/870.16 |
| 5,766,538 | A | 6/1998 | Kossmann | |
| 5,948,970 | A * | 9/1999 | Te'eni | 73/54.03 |
| 6,062,778 | A | 5/2000 | Szuba et al. | |
| 6,227,039 | B1 * | 5/2001 | Te'eni | 73/54.03 |
| 6,342,750 | B1 * | 1/2002 | Braungardt et al. | 310/323.18 |
| 6,544,025 | B1 | 4/2003 | Steffen et al. | |
| 2002/0147506 | A1 | 10/2002 | Eryurek et al. | |
| 2003/0030565 | A1 * | 2/2003 | Sakatani et al. | 340/679 |
| 2003/0046382 | A1 | 3/2003 | Nick | |
| 2005/0017873 | A1 * | 1/2005 | Liu et al. | 340/870.01 |

(Continued)

FOREIGN PATENT DOCUMENTS

DE 44 00 839 7/1995

(Continued)

OTHER PUBLICATIONS

Kloeppel-J.,"Smart Bricks Could Monitor Buildings, Save Lives" Univ of Illinois at Urbana-Champaign Jun. 12, 2003 p. 1-2.*

(Continued)

*Primary Examiner*—Ramesh B Patel
(74) *Attorney, Agent, or Firm*—Burr & Brown

(57) ABSTRACT

A device is provided for monitoring and controlling a machine having at least two sensors for recording measurement variables, particularly motion variables, and with an electronic control loop for evaluating the recorded measurement variables and correspondingly controlling machine components of which the measurement variables can be influenced.

39 Claims, 9 Drawing Sheets

U.S. PATENT DOCUMENTS

| | | | | |
|---|---|---|---|---|
| 2005/0088059 | A1 * | 4/2005 | Ohkubo et al. | 310/319 |
| 2006/0164040 | A1 * | 7/2006 | Ohkubo | 320/135 |

FOREIGN PATENT DOCUMENTS

| | | |
|---|---|---|
| DE | 195 11 324 | 10/1996 |
| DE | 197 41 954 | 3/1999 |
| DE | 199 56 961 | 5/2001 |
| EP | 0 908 555 | 4/1999 |
| EP | 10 64 131 | 1/2001 |
| FR | 2 738 910 | 3/1997 |

OTHER PUBLICATIONS

Finefield et al., "Combined Feedback and Adaptive Digital Control of Cylinder Vibrations Using Smart Materials" 1992 IEEE p. 1809-1814.*

* cited by examiner

DEVICE FOR MONITORING AND CONTROLLING A MACHINE

FIELD OF THE INVENTION

The present invention relates to a device for monitoring and controlling a machine.

BACKGROUND OF THE INVENTION

DE 199 56 961 A1 discloses a method for checking the effect of vibrations on the shaping and compacting of concrete articles which are produced in shock vibration finishers. For this purpose, measurement values of motion variables are recorded, which are correlated to the degree of compacting and/or the compacting time, and are recorded on the vibration finisher. The method makes it possible to compare nominal values and actual values recorded at reference points and to recognize deviations and to influence associated motion variables. The recording is done by acceleration sensors and measurement value processing associated with these.

DE 197 41 954 A1 discloses a method and a device for producing shaped concrete parts in which the intensity of vibration is dependent on the degree to which the mold is filled, and it is proposed to record the filling level of the mold by measuring the propagation time of waves emitted by a transmitter and reflected by the concrete filled in.

EP 1 064 131 B1 discloses a concrete compacting arrangement which comprises vibrating units which in each case generate a signal which corresponds to a vibration generated by the vibration generating device at the shell. This signal is forwarded to a controller through which a frequency converter is driven. It is also provided to connect the individual controllers to one another via data lines in order to provide mutual information exchange, and it is additionally proposed to couple a master computer to the data line so that each individual controller can be driven centrally.

DE 195 11 324 A1 discloses a method and a device for quality testing during the production of concrete bricks where the height of freshly produced concrete bricks is measured contactlessly here by means of distance measuring devices.

DE 44 00 839 A1 discloses a device for producing prefabricated concrete parts which has a number of vibrating frames. To achieve synchronous operation while avoiding the use of synchronizing shafts, sensor devices which are connected to an electronic control device are used in order to achieve synchronous vibration of at least two devices.

As a rule, the prior art only provides partial solutions which, in particular, are subject to interference with respect to the data transmission.

SUMMARY OF THE INVENTION

The present invention is based on the object of developing a device for monitoring and controlling a machine which has data acquisition suitable for hard environmental conditions.

In the device according to the present invention, data can be wirelessly exchanged via a radio link via transmitting and/or receiving devices between the sensors and an electronic control loop which forms an evaluating and control unit. The data comprise measurement variables such as, for example, frequency of vibration, amplitude of vibration, duration of vibration or pressing power with which the top part of the mold acts on the bottom part of the mold. In the case of a brick shaping machine, the recorded data also includes adjustment of the conglomerate such as, for example, the filling quantity, the moisture or the proportion of additives. The embodiment of the device according to the invention makes it possible to dispense with data lines which are very susceptible to interference under rough conditions, for example in the production of bricks, and which present great problems in feeding them, in particular, to a component which needs to be changed frequently, for example a mold device. Using sensors designed for data radio is advantageous, particularly also with respect to a component which has to be changed regularly, for example a mold device, since the sensor can also be used outside the mold device for logistical purposes, for example for recording the storage location of the mold device. Such a sensor can be used already during the production of the mold device for controlling or monitoring or documenting the production, respectively.

According to one aspect of the present invention, the sensor is equipped with its own power supply in order to dispense with the feeding in of power by this means, to eliminate another potential interference source and simplify the handling.

According to another aspect of the present invention, the sensor is equipped with a data memory for storing data determined by the respective sensor itself and/or data determined by another sensor. When a number of such sensors are used, redundant data storage is possible.

According to another aspect of the present invention, the sensor is equipped with a processor which handles the processing of data determined by the respective sensor itself and/or determined by another sensor. Equipping the sensors in this manner allows preprocessing of data, for example for reducing the volume of data which would have to be forwarded.

According to one aspect of the present invention, the sensor includes its own power source which, in particular, is constructed as a rechargeable battery. With such a configuration, proven standard components can be used which have long service lives.

It is also provided that the power source can be charged up by means of vibrations which are generated by the brick shaping machine during the brick production, and that a generator is used for this purpose. In this manner, a power supply occurring at regular intervals can be provided during the operation of the individual brick shaping machine.

In particular, the present invention provides a generator operating in accordance with the Faraday principle which comprises a piston freely oscillating in a cylinder. Such a generator is rugged and simple to produce.

According to another aspect of the present invention, the cylinder is aligned with the freely oscillating piston with its longitudinal axis in the main direction of vibration prevailing at the sensor. By this means, the available vibrational energy can be optimally utilized.

According to one embodiment of the present invention, the cylinder is automatically oriented in space under inertial control. A sensor having such a generator automatically adapts itself to the environmental conditions at the site of installation so that incorrect installation is impossible.

According to the present invention, the power source, particularly a battery, is charged contactlessly, particularly inductively. By this means, it is also possible to charge a sensor allocated to the mold device outside a brick shaping machine, for example in a store with high shelves or during transportation with a forklift truck.

The invention also provides for an exchange of data and, in particular, an exchange of internal and external data among the sensors. This makes it possible to form one or more radio chains for forwarding data.

It is also provided that the electronic control loop is integrated into the radio chain and thus to implement a starting point or an end point for the radio chains.

The present invention preferably uses a sensor, which adjusts its transmitting power to one or more of the neighboring sensors, which can be reached with the lowest transmitting power in order to load the power source as little as possible.

According to the present invention, the data received from a second sensor by means of the processor arranged in the sensor is checked on the basis of internal data and/or on the basis of the data received from a third sensor and to report the result. As a result, maladjustments and failures of individual sensors can be recognized and compensated for independently of the electronic control loop.

Finally, the present invention involves using sensors which provide for contactless measurement by means of rays or waves received or sent out and received. This makes it possible, for example, to dispense with the arrangement of a sensor on or in the mold device so that it is not required to retrofit older mold devices.

The present invention makes it possible to adapt the control of the brick shaping machine to the situations actually prevailing at the mold device and thus to optimally deal with each set of bricks in the brick shaping machine. In particular, this makes it possible to produce a uniform quality when starting up a brick shaping machine or in the case of changes in the characteristic or the composition of the conglomerate. The controlling of the brick shaping machine can include characteristic variables such as, for example, flexion, tension, frequency or acceleration of the mold device and/or of the conglomerate and these then effect, for example, a change in the frequency of vibration or the duration of vibration or the pressure with which the brick shaping machine acts on the mold device. Due to the wireless exchange of measurement and/or control data, complex and interfering cabling arrangements on the brick shaping machine or the mold device can be dispensed with. Arranging a sensor in the mold device makes it possible to attach the sensor in a protected manner and to allocate it unmistakably to a particular mold device. Furthermore, such accommodation of the sensor does not complicate a change of mold in an unwanted manner.

According to one aspect of the present invention, one of the sensors is connected to a vibration-loaded component. According to another aspect, one of the sensors is connected to a torsion-loaded component. According to another aspect of the present invention, one of the sensors is connected to a component under bending load. According to another aspect of the present invention, one of the sensors is connected to a pressure loaded component, and according to yet another aspect, one of the sensors is connected to a tension loaded component.

According to a particular embodiment of the present invention, the sensor is arranged separately from the mold device on the brick shaping machine, the sensor performing a contactless measurement of the characteristic variable to be observed in the mold device. For such a setup, controlling the brick shaping machine on the basis of characteristic variables of the mold device is possible even when conventional mold devices are used. Each brick shaping machine thus only requires the retrofitting of one sensor independently of the number of mold devices used.

Finally, the present invention also provides for the use of the device in vehicles for monitoring the service life of safety-related components and/or documenting their loads, for example. Since safety-related components are frequently subject to vibrational loads and cabling of safety-related components is also frequently associated with great problems, the device according to the present invention provides for an uncomplicated checking capability which can also be easily retrofitted. The spectrum of possible reactions to the evaluation of the measurement values extends from driving a warning lamp up to the controlling intervention in machine components such as, for example, avoiding loading peaks by means of control measures.

According to the present invention, at least two sensors are used at different components in order to be able to reliably diagnose wrong measurements or total failures.

Controllable machine components according to the present invention are understood to be machine components such as, for example, vibrators, hydraulic cylinders, pneumatic cylinders, dispensers, mixers, moisteners for the conglomerate, dryers for the conglomerate and the actuators described below.

BRIEF DESCRIPTION OF THE DRAWINGS

Further details of the present invention will be described by means of exemplary embodiments shown diagrammatically in the drawing, in which.

DETAILED DESCRIPTION OF THE INVENTION

Figure 1:
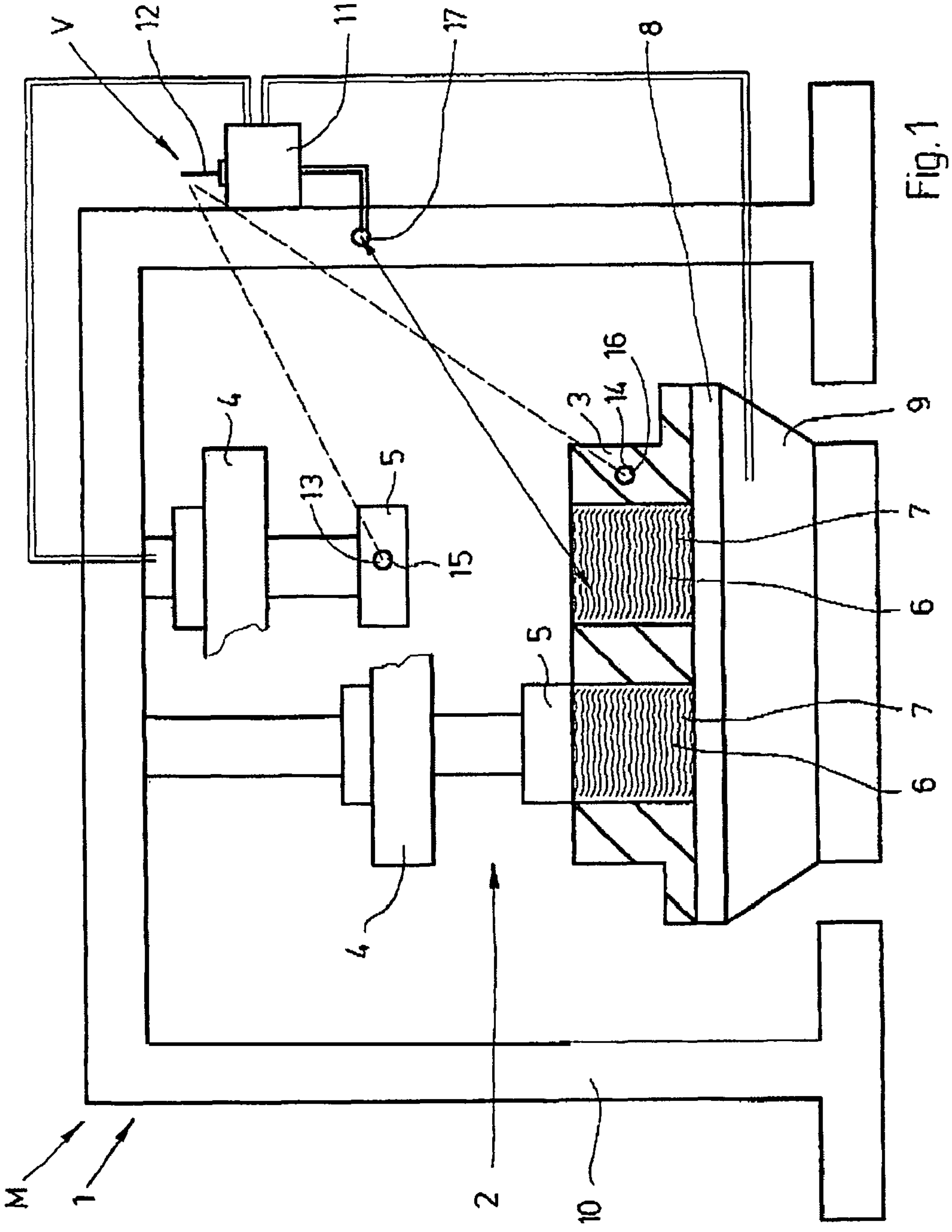
FIG. 1 shows a diagrammatic representation of a brick shaping machine with a mold device and different sensors.

FIG. 1 shows a brick shaping machine 1 of a set of brick shaping machines M with a mold device 2. The mold device 2 consists of a bottom mold part 3 and a top mold part 4. The top mold part 4 is shown divided and in two different positions for illustrating the sequence of motion. During the production process, the top mold part 4 acts with pressure plates 5 on a conglomerate 6 which is filled into mold nests 7 from a charging car, not shown. The bottom mold part 3 which, according to a variant of the embodiment not shown, can be constructed of a number of parts, e.g. of a mold frame and a mold insert held therein, lies on a mold base 8. The mold base 8, in turn, is supported on a vibrating table 9 via which vibrations can be introduced into the bottom mold part 3 in a familiar manner. To maintain clarity, the bracing of the bottom mold part 3 with a frame 10 of the brick shaping machine 1, which is usually present, has been omitted.

A device V comprises an electronic control device 11 with a transmitting and receiving device 12 for exchanging data with sensors 13 and 14. In this arrangement, the sensor 13 is arranged in the pressure plate 5 of the top mold part 4 and the sensor 14 is located in the bottom mold part 3. The measurement values determined by the sensors 13 and 14 are transmitted by transmitting and receiving devices 15 and 16, respectively, of the sensors 13 and 14 via the transmitting and receiving device 12 to the electronic control device 11. These data are evaluated by means of control algorithms and, if necessary, the frequency of vibration or duration of vibration of the vibrating table 9 or of the pressing power of the top mold part on the conglomerate is changed on initiation by the electronic control device 11. Furthermore, the electronic control loop 11 is connected to a sensor 17 by means of which, e.g. the temperature of the conglomerate 6 and the frequency of vibration of the bottom mold part 3 can be recorded by means of remote measurement.

Figure 2:
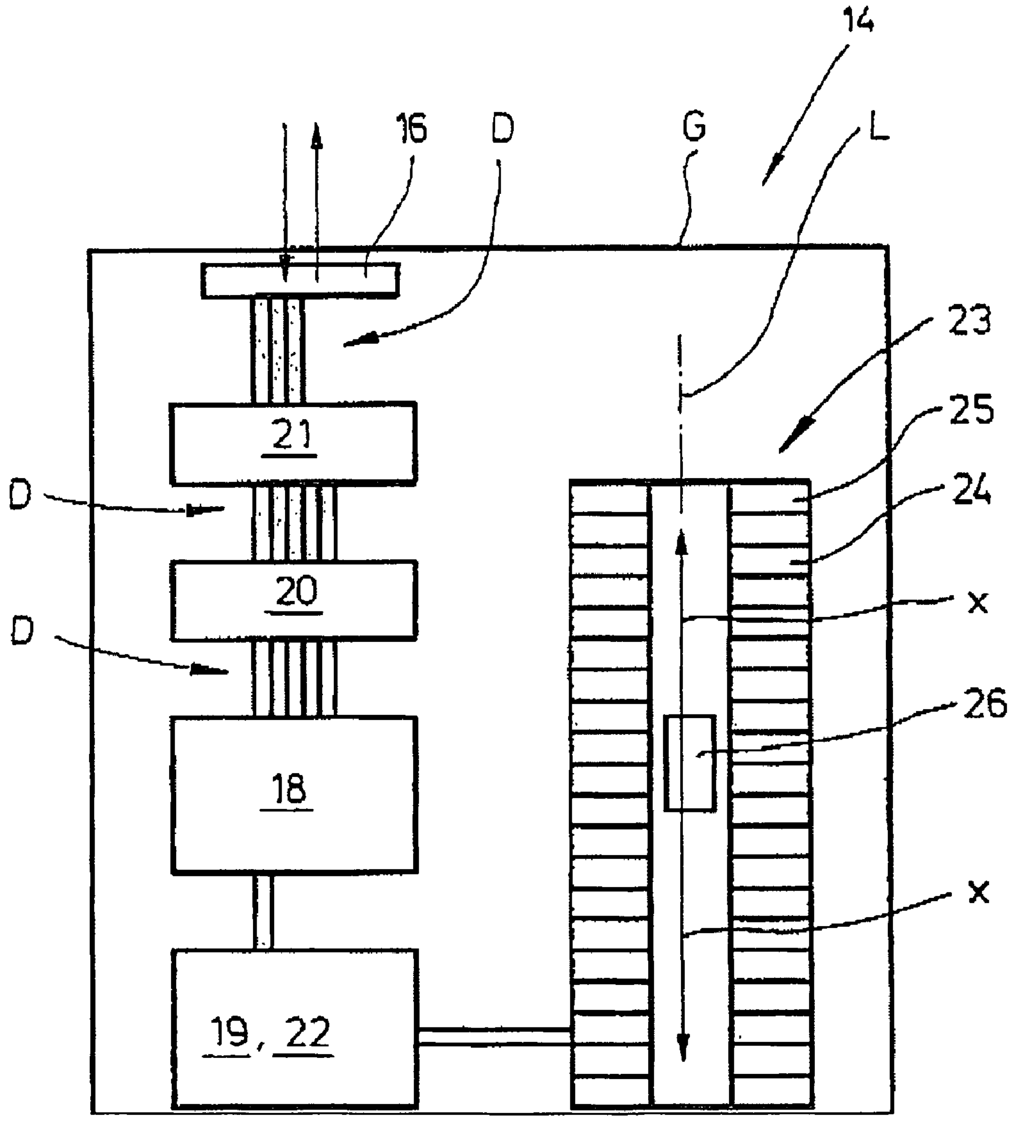
FIG. 2 shows a sensor.

FIG. 2 shows a sensor 14 in a diagrammatic view. The sensor 14 is arranged in a housing G and comprises a probe 18 by means of which, for example, motion variables such as frequency of vibration and amplitude of vibration are recorded. According to a variant of the embodiment, not shown, at least one further probe is provided by means of which, for example, a temperature is recorded. The probe 18 is supplied with current by a power source 19, which also forwards the probe 18 to a subsequent processor 20, a subsequent data memory 21 and a subsequent transmitting and receiving device 16. The components 18, 20, 21 and 16 are also connected to one another by means of a data bus D. The power source 19, constructed as a rechargeable battery 22, is electrically connected to a generator 23. The generator 23 is arranged inside the housing G of the sensor 14 and operates in accordance with the Faraday principle. The generator 23 comprises a coil 24 with a longitudinal axis L which is constructed as a cylinder 25 in which a magnet 26 can be moved to and fro in the directions of arrows x and x' in order to generate current. The reciprocal movement of the magnet 26 is caused by the vibration of the mold device in which the sensor 14 is installed, for example. When the sensor is used on the mold base or on the machine frame, the vibrations present there are also used for obtaining energy. According to a variant of the embodiment not shown, the generator or the generator and the power source form an energy module, separate from the sensor, with its own housing which can be connected to the sensor. This modular construction then also allows a number of energy modules to be connected to a sensor if the latter has an increased energy requirement or a redundant energy supply is desired. As an alternative, supplying a number of different or identical sensors by means of one energy module is also provided for.

Figure 3:
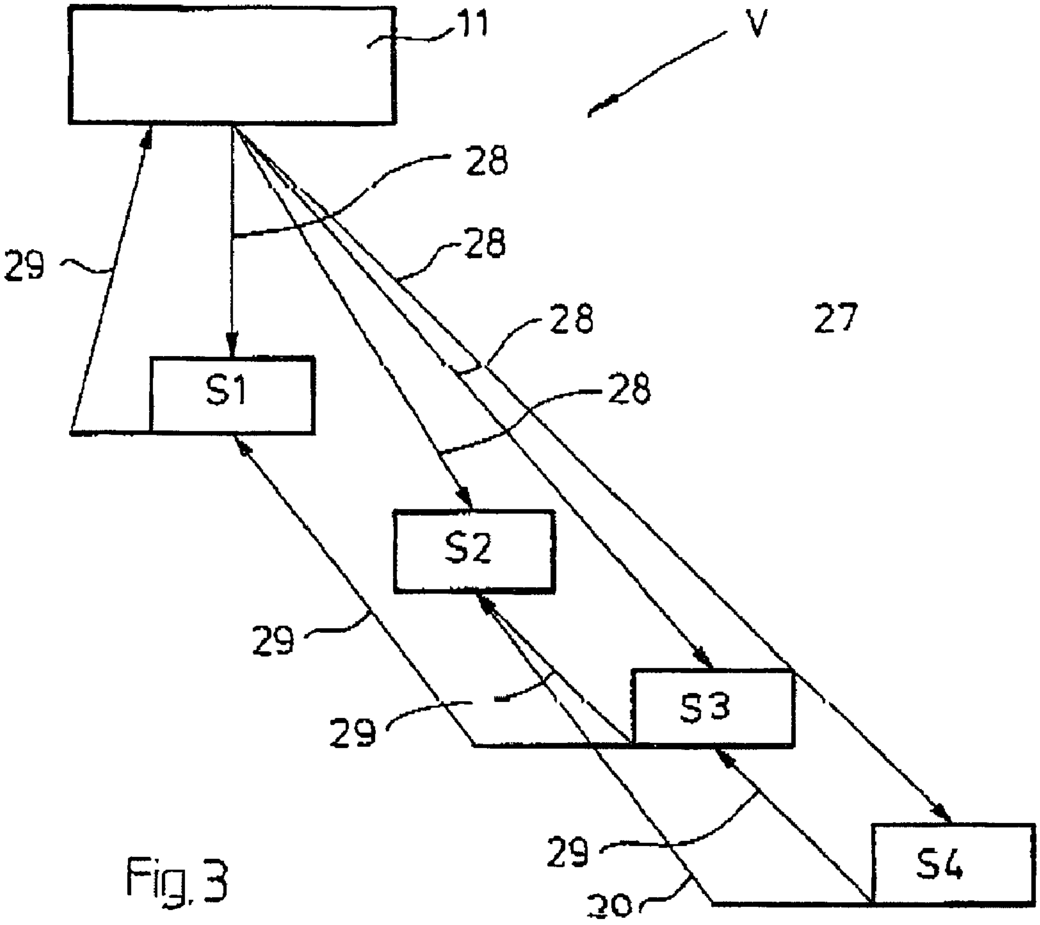
FIG. 3 shows a first radio chain.

FIG. 3 diagrammatically shows a radio chain 27 built up by means of a device V, which is built up from sensors S1 to S4 to an electronic control loop 11 or, respectively, from the electronic control loop 11 to the sensors S1 to S4. The electronic control loop 11 sends its information 28 to all sensors S1 to S4 since it has sufficient transmitting energy. To keep their energy consumption for the transmission of information as low as possible, the individual sensors S1 to S4 transmit their information 29 in each case only to the nearest and second-nearest sensor in the direction of the electronic control loop 11. For example, the sensor S4 only transmits its information to the sensors S3 and S2 and not to the far distant sensor S1 or directly to the electronic control loop 11. According to the invention, it is provided to either define the neighborhood relationships between the sensors once or to allow a dynamic process which also responds to temporarily present interference sources.

Figure 4:
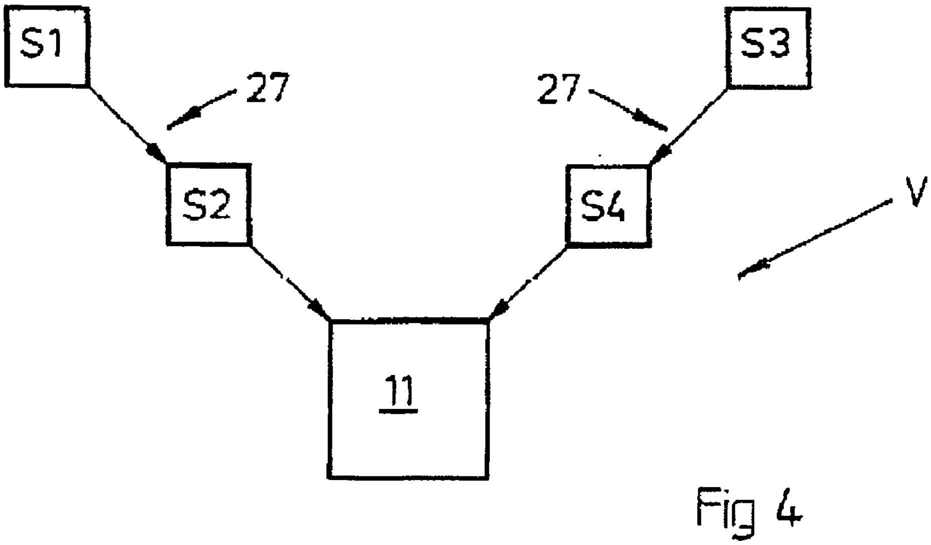
FIG. 4 shows two radio chains.

FIG. 4 shows a device V which comprises two radio chains 27 which are in each case built up from sensors S1 and S2 and, respectively, S3 and S4 to an electronic control loop 11.

Figure 5:
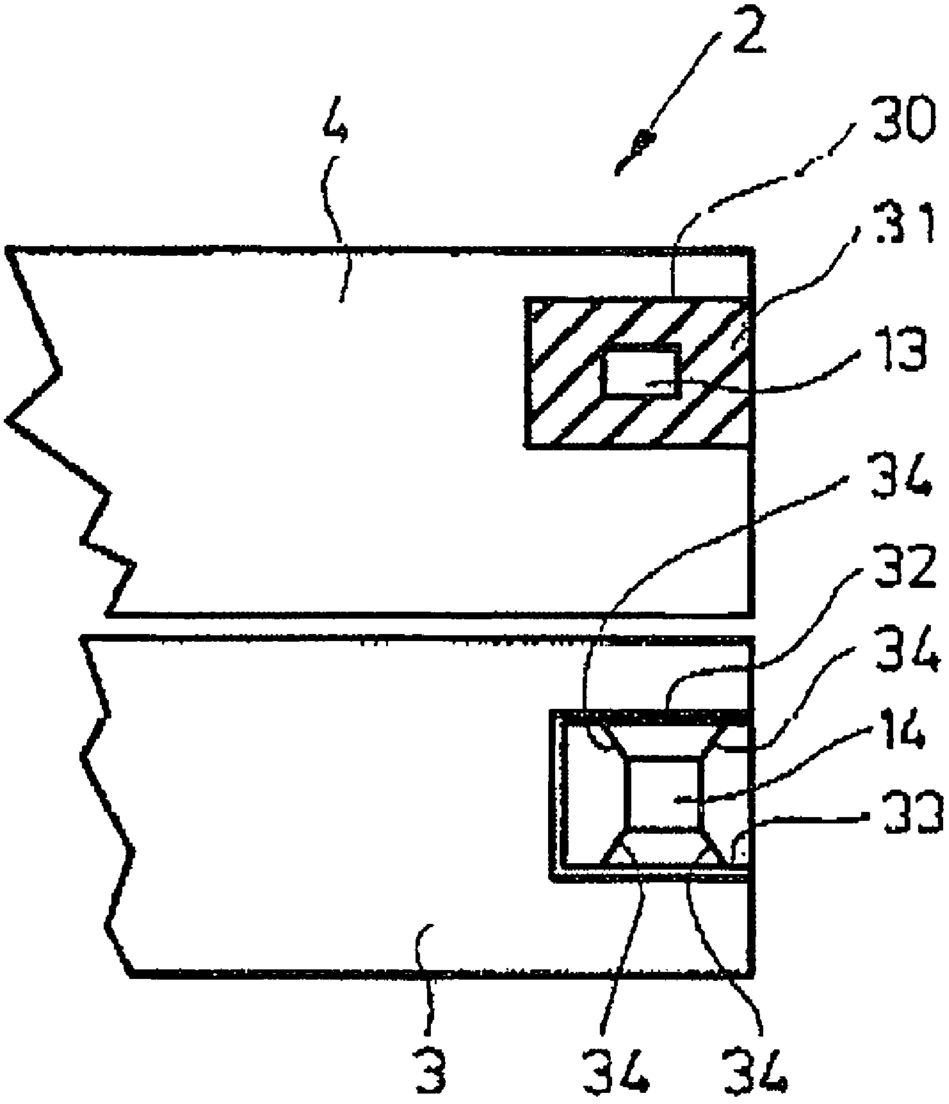
FIG. 5 shows a diagrammatic detailed representation of a mold device.

FIG. 5 diagrammatically shows a section of a mold device 2. Of the mold device 2, a bottom mold part 3 and a top mold part 4 can be seen. The two mold parts 3 and 4 show attachment possibilities for sensors 13 and 14 by way of example. In the top mold part 4, the sensor 13 is embedded in an elastic compound 31 in a recess 30. This protects the sensor 13 against extreme loads. The electronic control loop 11 to which the sensor 13 forwards its data is programmed in such a manner that characteristic values describing the elastic support are taken into consideration in the evaluation. The sensor 14 is supported-in a recess 32 in the bottom mold part 3, wherein the sensor 14 is held by struts 34 in a cage 33 for this purpose. The cage 33 is provided by being screwed, pressed or bonded into the recess 32. The struts 34 protect the sensor 14 against extreme loads. This type of support too, can be taken into consideration by the electronic control loop by way of characteristic variables.

Figure 6A:
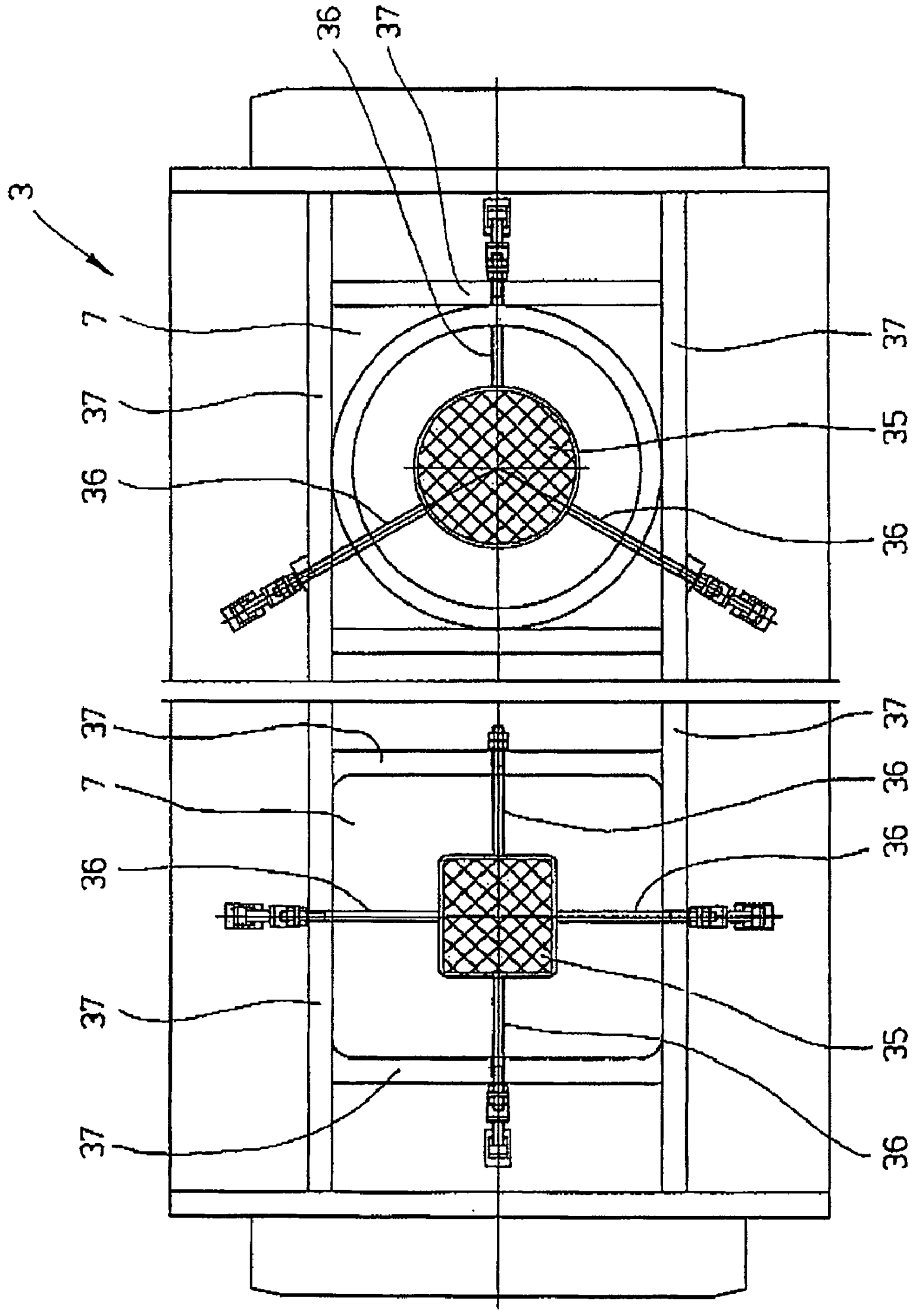
FIG. 6*a* shows a bottom mold part with guy wires and sensors.
Figure 6B:
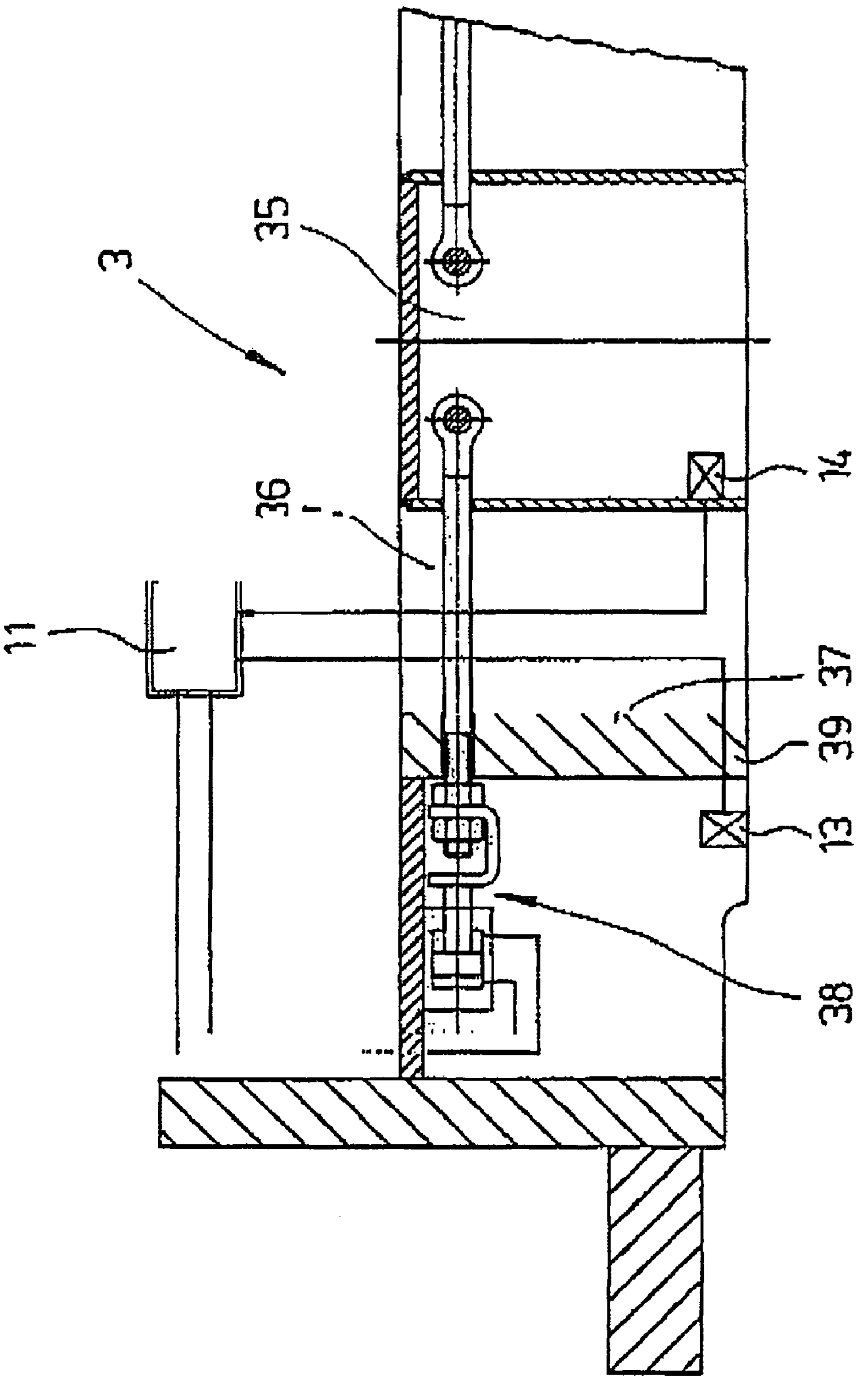
FIG. 6*b* shows a cut side view of FIG. 6*a;*

FIG. 6*a* shows a top view of a bottom mold part 3 which has mold nests 7 in which a core 35 is arranged in each case. The cores 35 are attached on plates 37 of the bottom mold part 3 via four and three wire cables 36, respectively. In FIG. 6*b*, the left-hand part of FIG. 6*a* is shown in a cut side view. In this side view, an actuator 38 can be seen in detail which applies different tractive forces to the core 35 via the wire cable 36. The actuator 38 is controlled by an electronic control unit 11 which, among other things, receives radio signals from sensors 13 and 14 which are positioned in the mold frame 39 of the bottom mold part 3 and in the core 35 of the bottom mold part 3. In this arrangement, the electronic control unit 11 performs an evaluation of the motion variables transmitted, for example, from sensors 13 and 14 and calculates from these control commands for the actuators 38 which are forwarded by wire or wirelessly to the actuators 38. In the actuator 38, the tension forces are generated pneumatically or hydraulically. In particular, the use of an electric motor with step-down gears is also provided to which, according to a further variant of the embodiment, a generator is allocated for generating energy from motion energy of the bottom mold part. According to a variant of the embodiment not shown, use of draw bars for attaching the core is provided.

Figure 7:
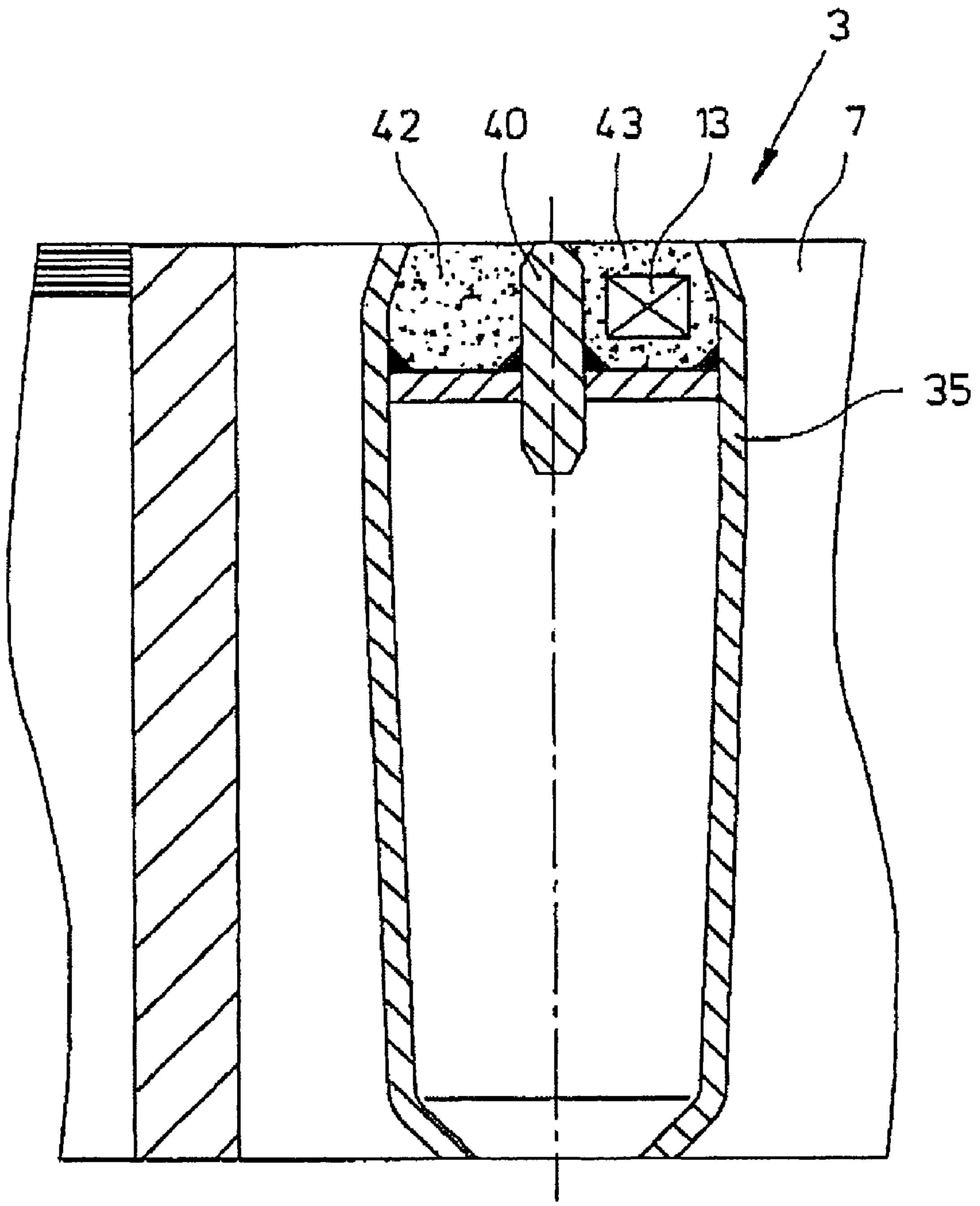
FIG. 7 shows a sensor arranged in a mold core which is embedded in foam.

FIG. 7 shows a section of a further bottom mold part 3 which has a mold nest 7 in which a core 35 is arranged. Between a core holder 40 and a core plate 41, a hollow space 43 filled with a filling material 42 is filled up in which a sensor 13 is also supported. The filling material 42 which is arranged, for example, as plastic or as concrete polymer, protects the sensor 13 effectively against environmental influences. The sensor 13 is connected to other sensors and/or to an electronic control device, not shown, via a radio link, not shown.

Figure 8:
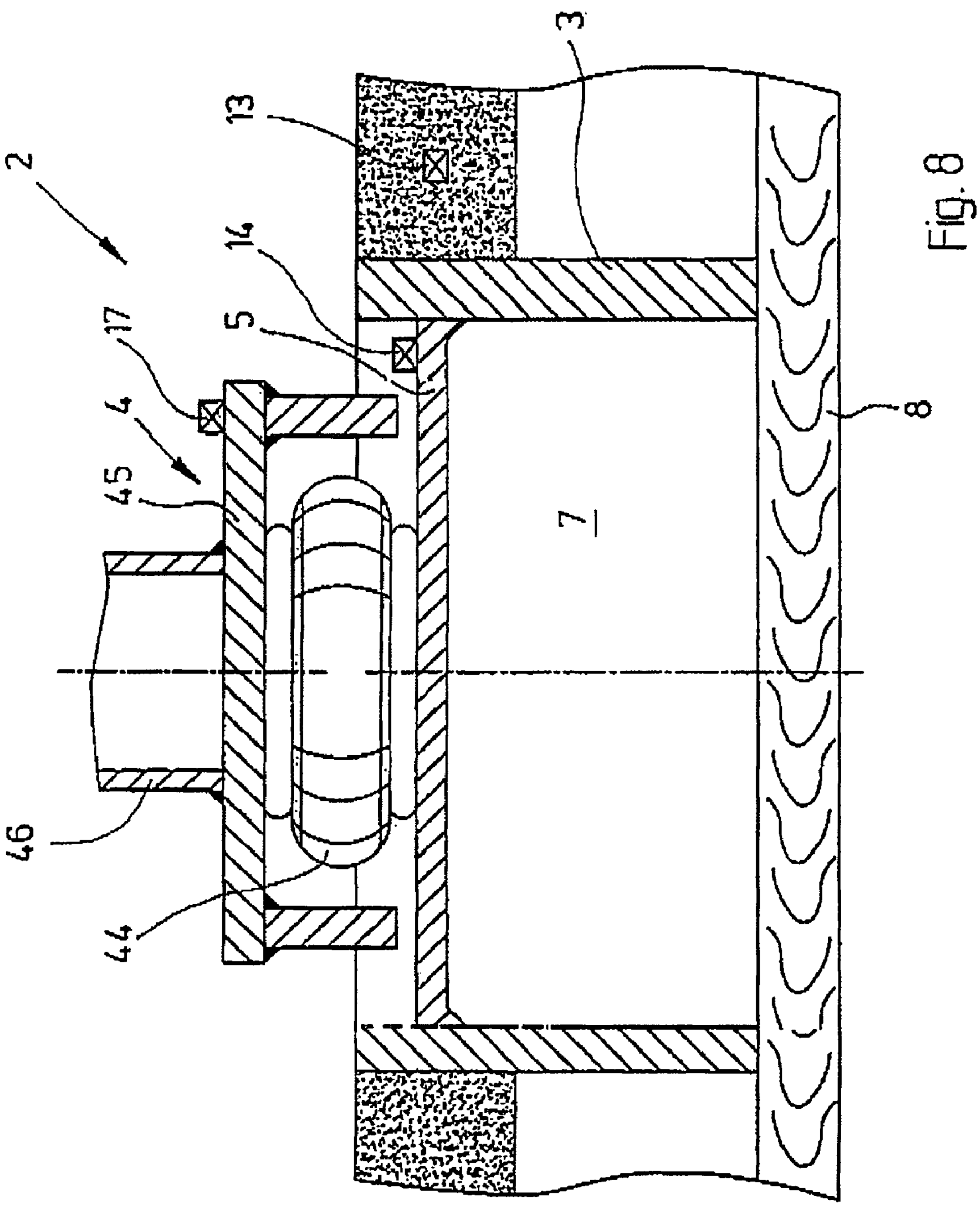
FIG. 8 shows three frequency pickups arranged at a mold device.

FIG. 8 shows a section of a mold device 2 in cut side view. On a mold base 8, a bottom mold part 2 is located from which a mold nest 7 is visible. A top mold part 4 acts with a pressure plate 5 on a conglomerate, not shown, which is located in the mold nest 7. The pressure plate 5 is movably suspended by a pneumatically or hydraulically operable bellows 44 on a support plate 45 which, in turn, is welded to a plunger pipe 46. To record characteristic variables, a sensor 13 is arranged in the bottom mold part 3, a sensor 14 is arranged on the pressure plate 5 and a sensor 17 is arranged on the support plate 45.

Figure 9:
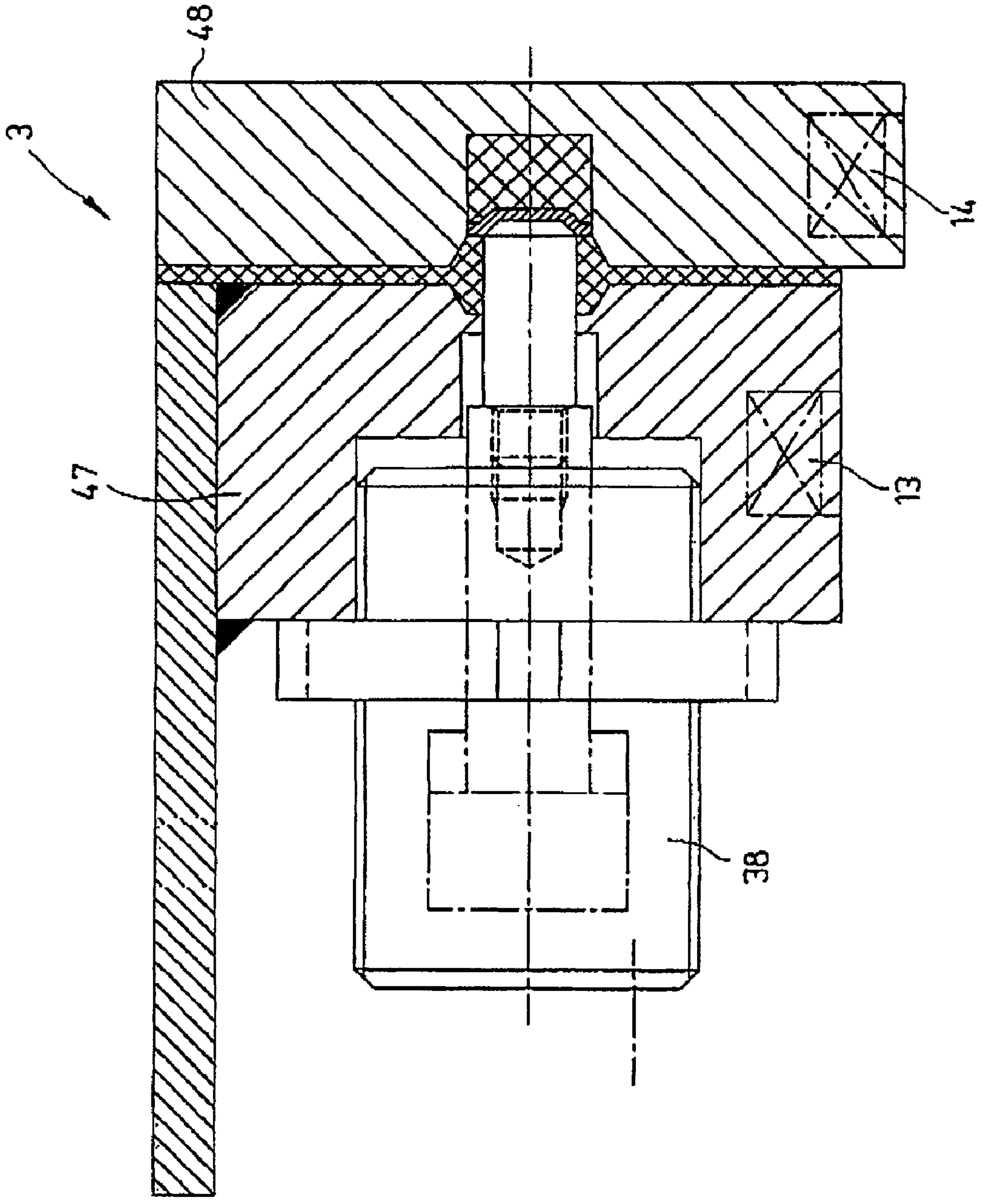
FIG. 9 shows an active damping unit controlled by means of sensors.

FIG. 9 shows a section of a bottom mold part 3 which comprises a mold frame 47 and a mold insert 48 supported therein. The bottom mold part 3 is equipped with at least two sensors 13, 14 which are distributed on the mold frame 47 and the mold insert 48. Analogously to FIGS. 6*a* and 6*b*, an actuator 38 is controlled which influences the damping between the mold frame 47 and the mold insert 48, by means of measurement variables which are transmitted from the sensors 13, 14 to an electronic control device, not shown, by radio.

The present invention is not restricted to exemplary embodiments shown or described. Rather it comprises developments of the invention covered by the patent claims. In particular, the present invention also provides for bidirectional communication between the electronic control device and the sensors. The device according to the present invention is also provided for use in a set of machines which consists of at least one brick shaping machine and at least one brick mold.

In addition, the invention provides for a realization of the embodiments described in the text which follows. The following embodiments are not restricted to the use of vibration meters but relate to the use of any type of sensors. It is provided to attach a number of vibration meters or sensors to the mold device.

The vibration meters or sensors can be attached to the individual assemblies of the mold device such as, e.g. the bottom mold part or top mold part but also to assemblies of the bottom mold part or top mold part such as, e.g. cores, partition walls or mold inserts or plunger plates. Furthermore, the attachment of sensors to components of the brick shaping machine is provided which are adjacent to the mold device. Furthermore, it is provided to control at least one adjustment of the brick shaping machine and at least one adjustment of the conglomerate by means of the electronic control loop. In principle, the electronic control loop can be formed by one or more special processors or by a computer with special software, wherein control signals and/or switching signals are conducted from the electronic control loop to corresponding actuators or controllers allocated to these.

The vibration meter or sensor assesses the structural constitution of the mold device in order to render a failure of the mold predictable.

The vibration meter or sensor is used for analyzing and evaluating the mold device in special test configurations.

The vibration meter or sensor is used for recording other values in the brick production process such as, for example, number of cycles and cycle times.

The vibration meter or sensor is used for adapting the vibration parameters to the vibratory characteristic of the mold device in order to selectively achieve the time of a superimposition of vibrations of vibrating table and mold device and to achieve a maximum of compaction with a minimum of energy introduced.

The control system according to the present invention allows uncontrolled vibrations to be avoided and amplitude and frequency to be checked and adapted selectively.

Overall, the control system according to the present invention leads to a reduction in cycle times and to an improved utilization of the energy of vibration.

Furthermore, sensors are provided which allow automated leveling of the components of the mold device and associated machine parts. According to the present invention, such monitoring can relate to the entire brick shaping machine and, particularly, to machine frame, machine foundation and machine components such as, e.g. ram plate, charging system, vibrating table etc.

With the sensors according to the present invention, measurement of the degree of moisture of the concrete conglomerate and/or of the temperature of the concrete conglomerate is also provided in order to derive from these optimum parameters for energy of vibration and times of vibration.

It is also provided to combine the vibration pickups or frequency pickups or sensors in groups and to have them monitor each other.

It is also provided to attach the sensor to the mold device by means of a magnetic clamp.

List of Reference Designations

1 Brick shaping machine
2 Mold device
3 Bottom mold part
4 Top mold part
5 Pressure plate
6 Conglomerate
7 Mold nest
8 Mold base
9 Vibrating table
10 Machine frame
11 Electronic control loop
12 Transmitting and receiving device
13 Sensor
14 Sensor
15 Transmitting and receiving device of 13
16 Transmitting and receiving device of 14
17 Sensor
18 Probe
19 Power source
20 Processor
21 Data memory
22 Battery
23 Generator
24 Coil
25 Cylinder
26 Magnet
27 Radio chain
28 Information from 11 to S1 to S4
29 Information from S1 to S4 to 11
30 Recess
31 Elastic compound
32 Recess
33 Cage
34 Strut
35 Core
36 Wire cable
37 Plate
38 Actuator
39 Mold frame
40 Core holder
41 Core plate
42 Filling material
43 Hollow space
44 Bellows
45 Support plate
46 Plunger pipe
47 Mold frame
48 Mold insert
G Housing of the sensor
L Longitudinal axis of 24
M Set of brick shaping machines
S1-S4 Sensor
V Device
x, x" Direction of motion of 26

The invention claimed is:

1. A device that monitors and controls a machine having at least one mold device comprising a top mold part and a bottom mold part disposed on a mold base which is supported on a vibrating table, comprising at least two sensors for recording measurement variables comprising motion variables selected from a group consisting of frequency of vibration, amplitude of vibration, duration of vibration and pressing power with which the top part of the mold device acts on the bottom part of the mold and an electronic control loop that evaluates the recorded measurement variables and correspondingly controls machine components which influence the measurement variables, wherein at least one sensor has its own power source which is fed by a generator that converts motion energy into electrical energy, wherein at least one sensor comprises a processor for processing data determined by the at least one sensor itself or data determined by another sensor, wherein the device is adapted to exchange data wirelessly between the sensors and the electronic control loop via at least one of a transmitting device and a receiving device, and wherein the at least one sensor comprises a data memory for storing at least one of data determined by the at least one sensor itself and data determined by another sensor.

2. The device as claimed in claim 1, wherein the generator operates in accordance with the Faraday principle using a piston freely oscillating a cylinder.

3. The device as claimed in claim 2, wherein the generator comprises a magnet freely oscillating in a coil.

4. The device as claimed in claim 3, wherein the coil is adapted to be aligned with its longitudinal axis in a main direction of vibration prevailing at the sensor.

5. The device as claimed in claim 3, wherein the coil is aligned automatically.

6. The device as claimed in claim 1, wherein the power source can be inductively charged.

7. The device as claimed in claim 1, wherein the sensors exchange data with one another.

8. The device as claimed in claim 1, wherein the sensors exchange internal and external data with one another.

9. The device as claimed in claim 1, wherein the sensors form at least one radio chain.

10. The device as claimed in claim 9, wherein the radio chain leads to the electronic control loop and comes from the electronic control loop, respectively.

11. The device as claimed in claim 1, wherein at least one sensor adjusts a transmitting power to one or more neighboring sensors which are accessible with a lowest amount transmitting power.

12. A device that monitors and controls a machine having at least one mold device comprising a top mold part and a bottom mold part disposed on a mold base which is supported on a vibrating table, comprising at least two sensors for recording measurement variables comprising motion variables and an electronic control loop that evaluates the recorded measurement variables and correspondingly controls machine components which influence the measurement variables, wherein at least one sensor has its own power source which is fed by a generator that converts motion energy into electrical energy, wherein at least one sensor comprises a processor for processing data determined by the at least one sensor itself or data determined by another sensor and wherein the device is adapted to exchange data wirelessly between the sensors and the electronic control loop via at least one of a transmitting device and a receiving device, wherein the processor of the sensor performs a plausibility check of data received from a second sensor on a basis of at least one of internal data and data received from a third sensor, and wherein the sensor reports a result.

13. The device as claimed in claim 1, wherein the machine is a brick shaping machine, wherein at least one sensor is arranged at or in the mold device, respectively, and wherein at least one further sensor is arranged at or in at least one of the mold base and a machine frame, respectively.

14. The device as claimed in claim 13, wherein the sensor is arranged outside the mold device and the sensor is adapted to perform contactless measurements on the mold device.

15. The device as claimed in claim 13, wherein the sensor is arranged outside the mold base and the sensor is adapted to perform contactless measurements on the mold base.

16. The device as claimed in claim 13, wherein the sensor is arranged outside the machine frame and the sensor is adapted to perform contactless measurements on the machine frame.

17. The device as claimed in claim 13, wherein the mold device comprises actuators which change characteristics of the mold device.

18. The device as claimed in claim 17, wherein the actuators act on wire cables or draw bars by means of which a core is held at the bottom mold part including a mold frame and the core.

19. The device as claimed in claim 17, wherein the actuators are adapted to be controlled by the electronic control loop.

20. The device as claimed in claim 18, wherein at least one sensor is in each case arranged in the mold frame and in each core.

21. The device as claimed in claim 18, wherein the sensor is embedded in the core.

22. The device as claimed in claim 13, further comprising an adjustable load in which a pressure piece is arranged via a cylinder at a support device, and wherein at least one sensor is in each case arranged at the support device and at the pressure piece.

23. The device as claimed in claim 1, wherein the bottom mold part has a mold frame and a mold insert at which at least one sensor is arranged in each case.

24. The device as claimed in claim 1, wherein one of the sensors is connected to a vibration-loaded component.

25. A device that monitors and controls a machine having at least one mold device comprising a top mold part and a bottom mold part disposed on a mold base which is supported on a vibrating table, comprising at least two sensors for recording measurement variables comprising motion variables and an electronic control loop that evaluates the recorded measurement variables and correspondingly controls machine components which influence the measurement variables, wherein at least one sensor has its own power source which is fed by a generator that converts motion energy into electrical energy, wherein at least one sensor comprises a processor for processing data determined by the at least one sensor itself or data determined by another sensor and wherein the device is adapted to exchange data wirelessly between the sensors and the electronic control loop via at least one of a transmitting device and a receiving device, wherein one of the sensors is connected to a torsion-loaded component.

26. The device as claimed in claim 1, wherein one of the sensors is connected to a component under bending load.

27. The device as claimed in claim 1, wherein one of the sensors is connected to a pressure-loaded component.

28. The device as claimed in claim 1, wherein one of the sensors is connected to a tension-loaded component.

29. A device that monitors and controls a machine having at least one mold device comprising a top mold part and a bottom mold part disposed on a mold base which is supported on a vibrating table, comprising at least two sensors for recording measurement variables comprising motion variables and an electronic control loop that evaluates the recorded measurement variables and correspondingly controls machine components which influence the measurement variables, wherein at least one sensor has its own power source which is fed by a generator that converts motion energy into electrical energy, wherein at least one sensor comprises a processor for processing data determined by the at least one sensor itself or data determined by another sensor and wherein the device is adapted to exchange data wirelessly between the sensors and the electronic control loop via at least one of a transmitting device and a receiving device, wherein a number of sensors are connected to a component which is subjected to different loads to record individual loads.

30. The device as claimed in claim 1, wherein the power source comprises a rechargeable battery.

31. The device as claimed in claim 5, where the device is automatically aligned under inertial control.

32. The device as claimed in claim 1, wherein the electronic control loop is adapted to initiate a change in one of a vibration frequency and a vibration duration of the vibrating table.

33. The device as claimed in claim 1, wherein the electronic control loop is adapted to initiate a change is a pressing power of the top mold part on a conglomerate material located in mold nests of the mold device.

34. A device that monitors and controls a machine having at least one mold device comprising a top mold part and a bottom mold part disposed on a mold base which is supported on a vibrating table, comprising at least two sensors for recording measurement variables comprising motion variables selected from a group consisting of frequency of vibration, amplitude of vibration, duration of vibration and pressing power with the top part of the mold acts on the bottom part of the mold and an electronic control loop that evaluates the recorded measurement variables and correspondingly controls machine components which influence the measurement variables, wherein at least one sensor has its own power source which is fed by a generator that converts motion energy into electrical energy, wherein the device is adapted to exchange data wirelessly between the sensors and the electronic control loop via at least one of a transmitting device and a receiving device, and wherein the sensors exchange internal and external data with one another.

35. A device that monitors and controls a machine having at least one mold device comprising a top mold part and a bottom mold part disposed on a mold base which is supported on a vibrating table, comprising at least two sensors for recording measurement variables comprising motion variables and an electronic control loop that evaluates the recorded measurement variables and correspondingly controls machine components which influence the measurement variables, wherein at least one sensor has its own power source which is fed by a generator that converts motion energy into electrical energy, wherein the device is adapted to exchange data wirelessly between the sensors and the electronic control loop via at least one of a transmitting device and a receiving device, and wherein one of the sensors is connected to a component under bending load.

36. A device that monitors and controls a machine having at least one mold device comprising a top mold part and a bottom mold part disposed on a mold base which is supported on a vibrating table, comprising at least two sensors for recording measurement variables comprising motion variables and an electronic control loop that evaluates the recorded measurement variables and correspondingly controls machine components which influence the measurement variables, wherein at least one sensor has its own power source which is fed by a generator that converts motion energy into electrical energy, wherein the device is adapted to exchange data wirelessly between the sensors and the electronic control loop via at least one of a transmitting device and a receiving device, and wherein one of the sensors is connected to a tension-loaded component.

37. A device that monitors and controls a machine having at least one mold device comprising a top mold part and a bottom mold part disposed on a mold base which is supported on a vibrating table, comprising at least two sensors for recording measurement variables comprising motion variables and an electronic control loop that evaluates the recorded measurement variables and correspondingly controls machine components which influence the measurement variables, wherein at least one sensor has its own power source which is fed by a generator that converts motion energy into electrical energy, wherein the device is adapted to exchange data wirelessly between the sensors and the electronic control loop via at least one of a transmitting device and a receiving device, and wherein a number of sensors are connected to a component which is subjected to different loads to record individual loads.

38. A device that monitors and controls a machine having at least one mold device comprising a top mold part and a bottom mold part disposed on a mold base which is supported on a vibrating table, comprising at least two sensors for recording measurement variables comprising motion variables and an electronic control loop that evaluates the recorded measurement variables and correspondingly controls machine components which influence the measurement variables, wherein at least one sensor has its own power source which is fed by a generator that converts motion energy into electrical energy, wherein the device is adapted to exchange data wirelessly between the sensors and the electronic control loop via at least one of a transmitting device and a receiving device, and wherein the electronic control loop is adapted to initiate a change is a pressing power of the top mold part on a conglomerate material located in mold nests of the mold device.

39. A device that monitors and controls a machine having at least one mold device comprising a top mold part and a bottom mold part disposed on a mold base which is supported on a vibrating table, comprising at least two sensors for recording measurement variables comprising motion variables selected from a group consisting of frequency of vibration, amplitude of vibration, duration of vibration and pressing power with the top part of the mold acts on the bottom part of the mold device and an electronic control loop that evaluates the recorded measurement variables and correspondingly controls machine components which influence the measurement variables, wherein at least one sensor has its own power source which is fed by a generator that converts motion energy into electrical energy, wherein the device is adapted to exchange data wirelessly between the at least two sensors and the electronic control loop via at least one of a transmitting device and a receiving device, wherein the sensors exchange internal and external data with one another, wherein the sensors form at least one radio chain which leads to the electronic control loop and comes from the electronic control loop, respectively, and wherein the electronic control loop is adapted to initiate a change in one of a vibration frequency and a vibration duration of the vibrating table.

* * * * *